Aug. 10, 1965   G. FRANCO ETAL   3,200,043
PLANT FOR REMOTE HANDLING OF NUCLEAR FUEL ELEMENTS
Filed June 13, 1961   5 Sheets-Sheet 1

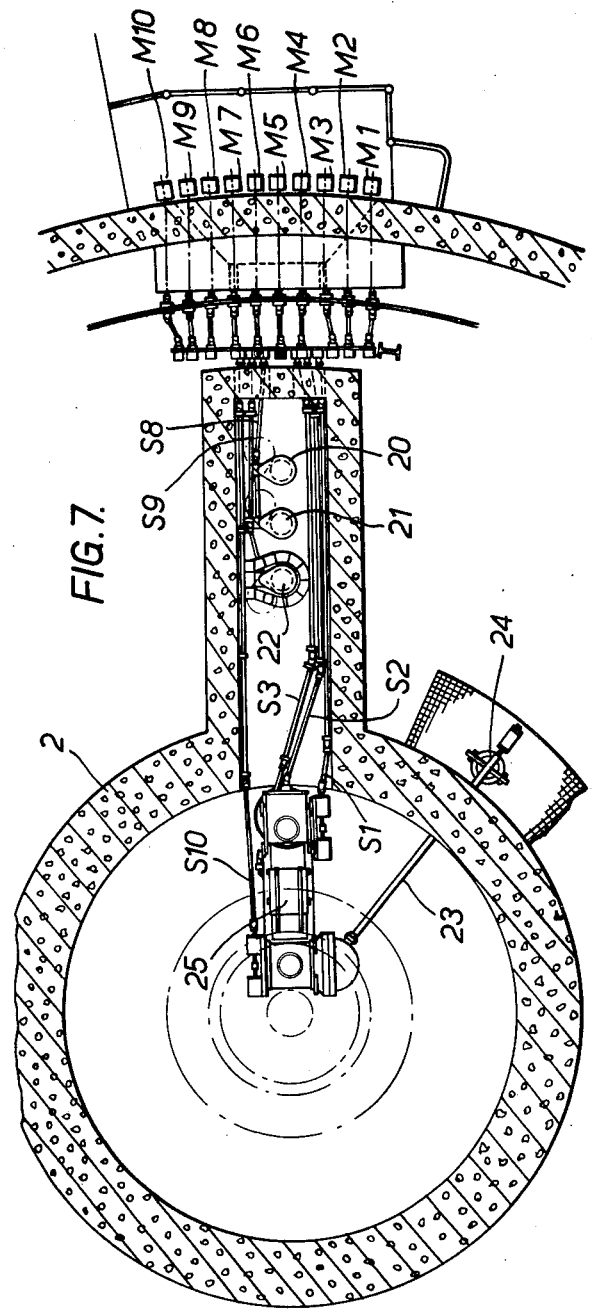

United States Patent Office 3,200,043
Patented Aug. 10, 1965

3,200,043
PLANT FOR REMOTE HANDLING OF NUCLEAR FUEL ELEMENTS
Gianfranco Franco, Bournemouth, and George Edward Lockett, Norman Kinkead, and Viggo Henning Sorensen, Dorset, England, assignors to United Kingdom Atomic Energy Authority, London, England
Filed June 13, 1961, Ser. No. 141,556
Claims priority, application Great Britain, June 24, 1960, 22,312/60
3 Claims. (Cl. 176—30)

This invention relates to plant for remote handling of nuclear fuel elements including the loading and unloading of elements into and from nuclear reactors having an inner containment structure housing a reactor pressure vessel. In all nuclear reactors which employ a solid fuel it becomes necessary to replace fuel elements from time to time and radiation hazards are considerable during this operation.

It is an object of the present invention to provide a system for remote handling of fuel elements in which radiation hazards are considerably reduced.

According to the invention, there is provided a nuclear reactor pressure vessel housing a nuclear reactor, a port in said pressure vessel through which the reactor is loaded and unloaded with fuel elements, an inner containment structure containing the pressure vessel and providing a transfer chamber, means defining a loading route for fuel elements and an unloading route for irradiated fuel elements, both routes having a common location at said port, and each route having a series of other locations in said transfer chamber wherein all said locations are in alignment with one another. The term "aligned locations" is used herein to include locations arranged in a straight linear path or in a curved path.

The plant may, for example, be integrated with a reactor enclosed within a pressure vessel into which the fuel elements are loaded as by being lowered in a vertical attitude through a gas lock in the vessel wall. The gas lock entry constitutes one of said locations, other locations conveniently arranged, for instance, in alignment with one another and the gas lock entry, may be: an acceptance point, a container facility and a delivery point for irradiated elements. Thus the transfer flask may, by being moved to each of the locations in proper sequence, serve to transport and handle fuel elements, whether enclosed in a container or not, through a number of operations which must be performed upon the elements between their delivery from a new element fuelling point and its return to an irradiated fuel element depository.

Figure 1:
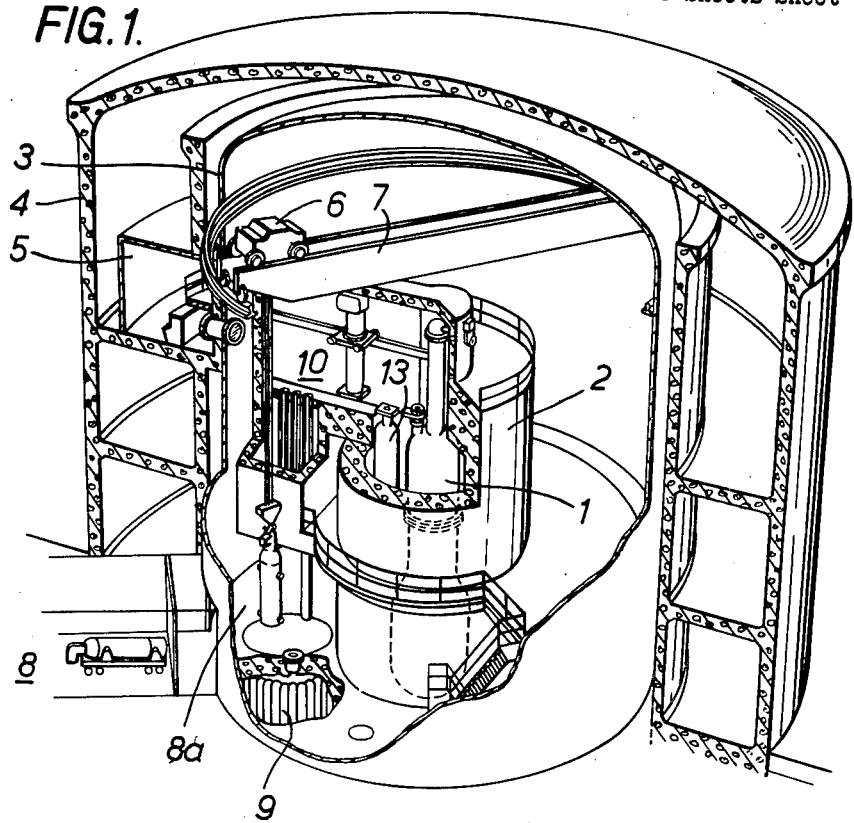
Figure 6:
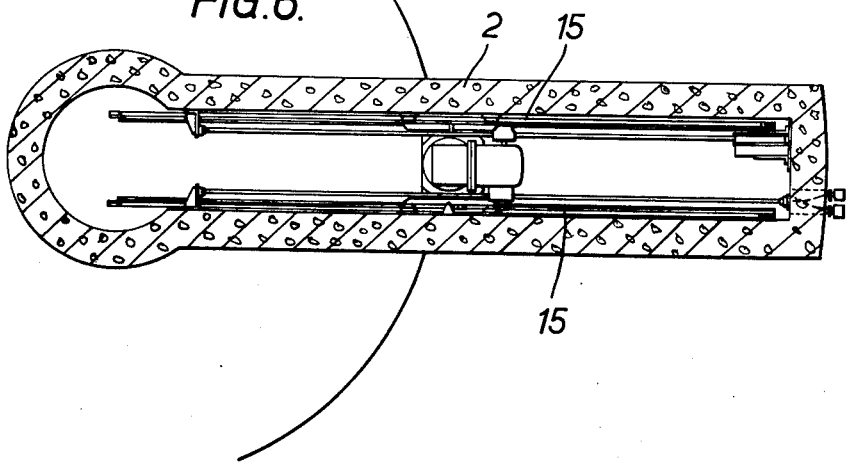
Figure 2:
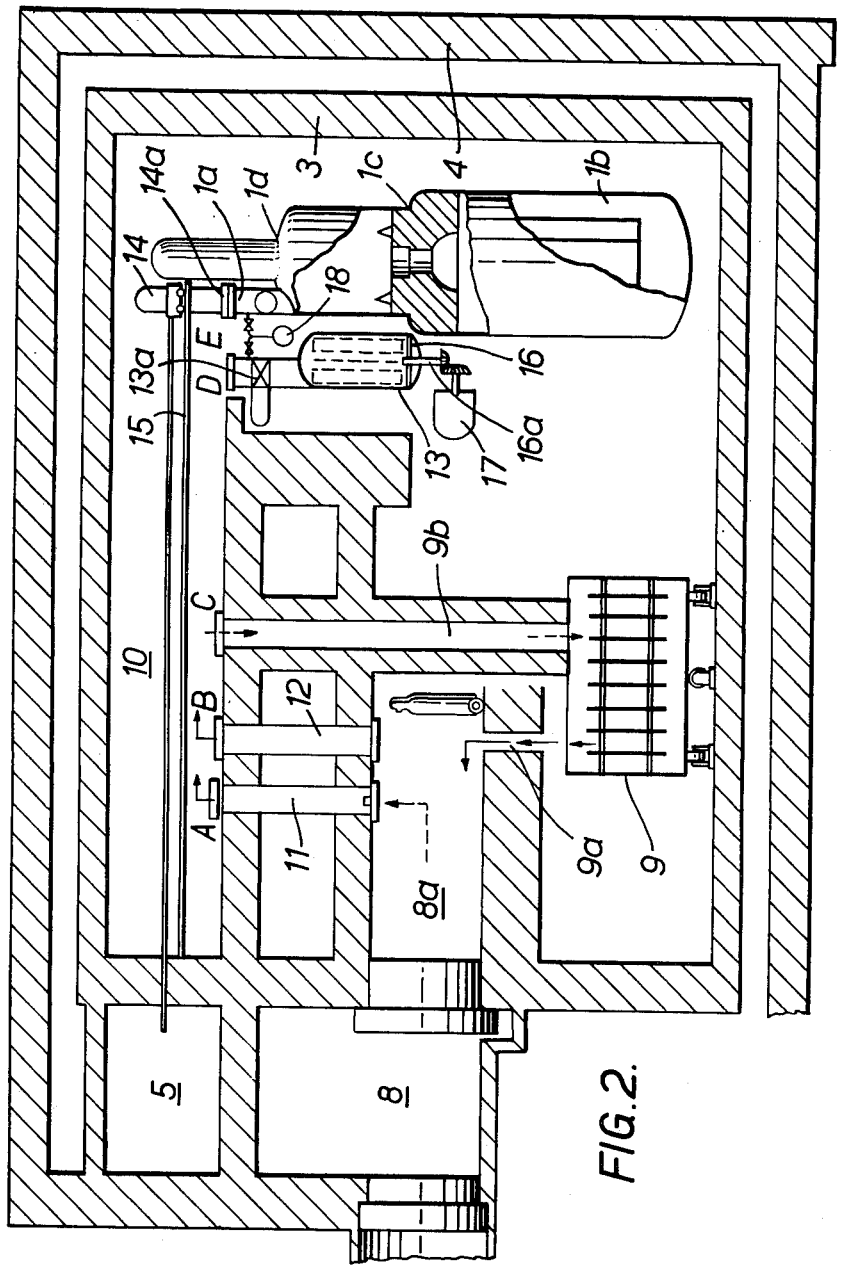
Figure 3:
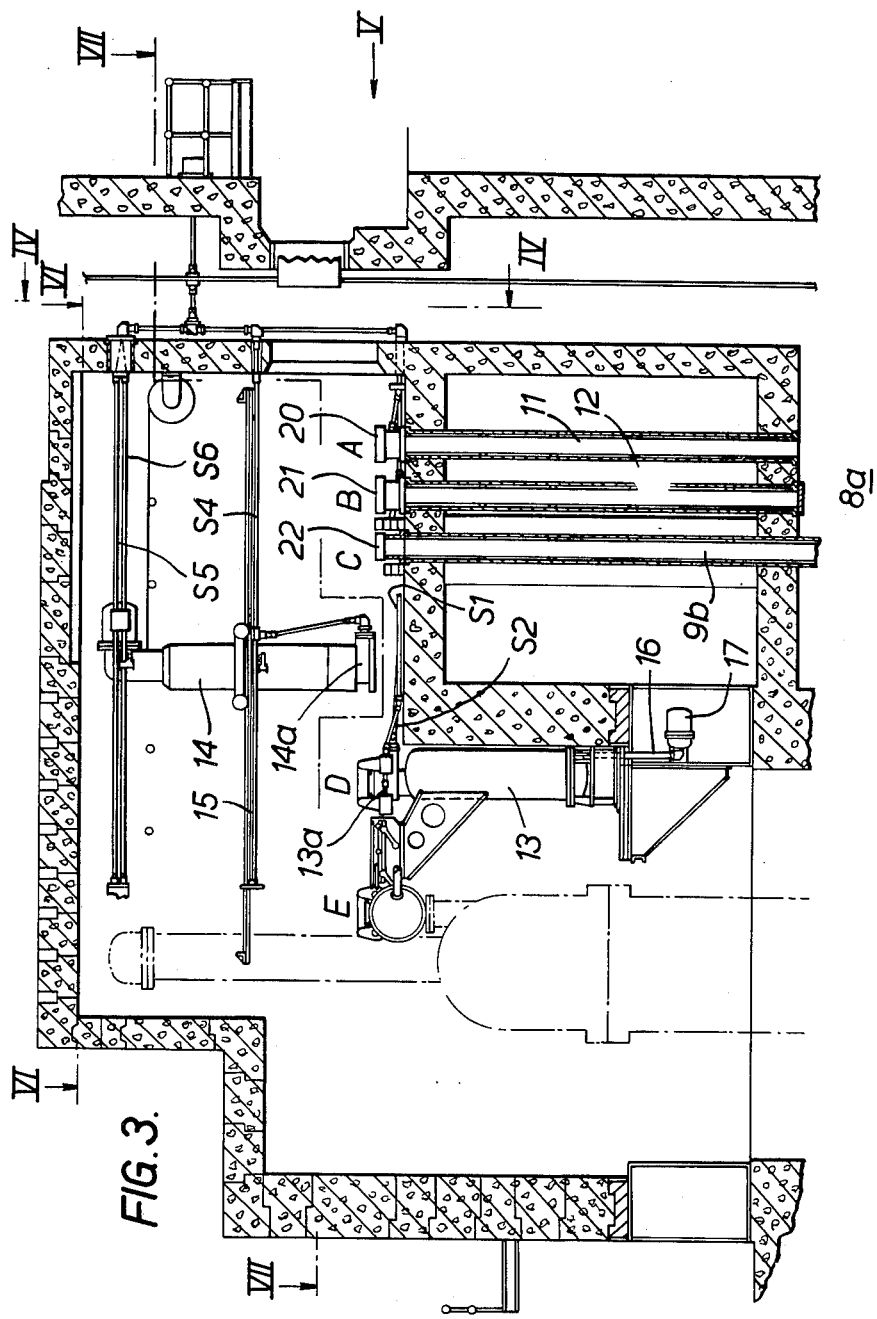
Figure 4:
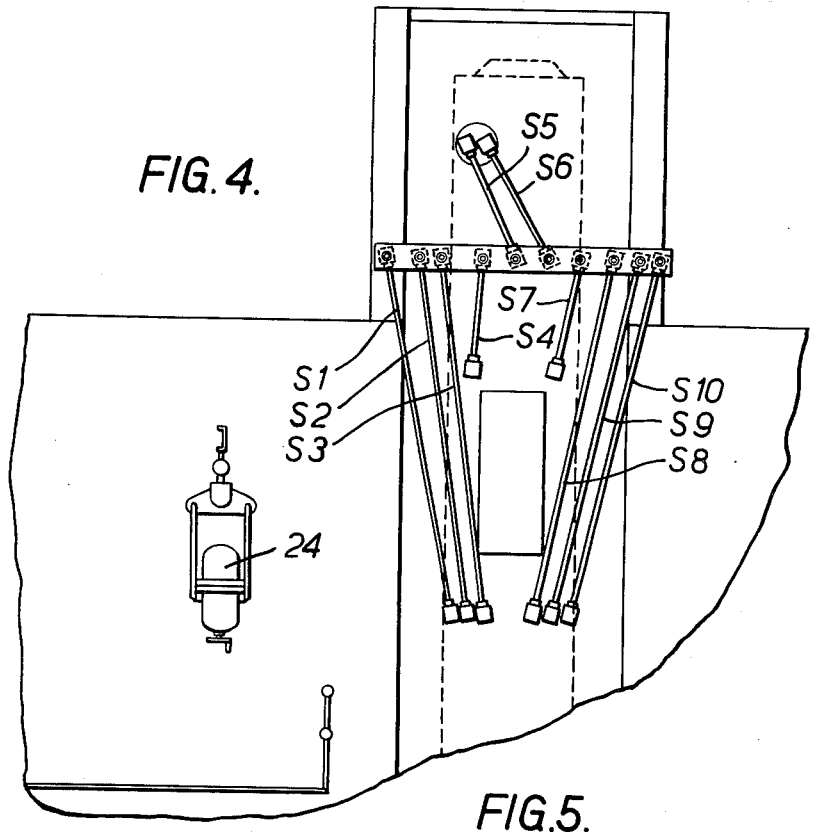
Figure 5:
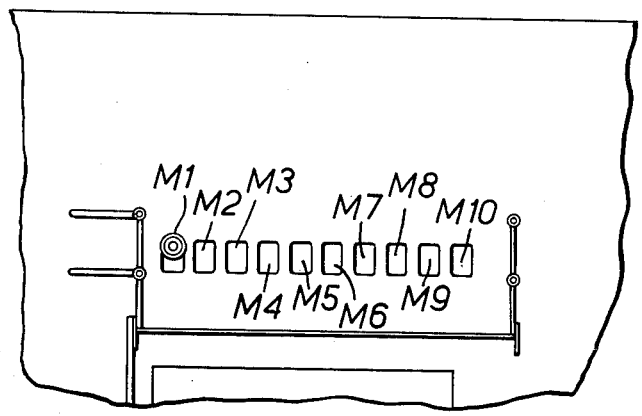

In order that the invention may be better understood, one embodiment will now be described with reference to the accompanying drawings in which, FIG. 1 is a perspective view of a gas cooled nuclear reactor part of which is cut away to show the inner components, FIG. 2 is a diagrammatic view showing in simplified form the transfer system for the fuel elements, FIG. 3 is a more detailed view of part of FIGS. 1 and 2, FIG. 4 is a part section on the line IV—IV of FIG. 3, FIG. 5 is a view of FIG. 3 in the direction of the arrow V, FIG. 6 is part plan view in cross section on the line VI—VI of FIG. 3 and FIG. 7 is part plan view in cross section on the line VII—VII of FIG. 3.

In FIGS. 1 and 2 sufficient parts of a high temperature helium gas cooled reactor are shown to demonstrate the means of transferring fuel elements into and out of the reactor.

The reactor proper is housed in a pressure vessel 1 and comprises an entry valve 1a, a lower chamber 1b containing the reactor core, a neck 1c closable by a shield plug (not shown) and an upper chamber 1d which houses the charge/discharge machine and a number of spikes for receiving fuel elements. The vessel 1 together with its concrete shielding 2, is housed in an inner containment building 3 which encloses a nitrogen atmosphere. The building 3 is enclosed by a double walled concrete outer containment building 4 in which is the fuel element charge machinery control room 5. A mobile crane 6 on a rotatable gantry 7 is mounted in the upper part of the inner containment building 3. An access passage 8 with airtight doors provides communication through the outer and inner containment into a loading bay 8a within the inner containment. A fuel element storage magazine 9 is located below ground level in the inner containment building, the magazine having many stations any one of which can be brought into communication with either of the vertical chutes 9a, 9b, leading to the loading bay 8a and a transfer passage or bay 10 respectively by the rotation of the magazine. The transfer bay 10 extends horizontally over five aligned locations A, B, C, D, and E within the inner containment as follows:

A, at the head of a loading or charge chute 11 extending vertically between the loading bay 8a and the transfer bay 10,
B, at the head of a chute 12, herein referred to as the spare chute, extending as the chute 11,
C, at the head of the chute 9b herein referred to as the discharge chute,
D, at the head of an entry valve 13a of a canning cell 13 and
E, at the head of the main entry valve 1a of the pressure vessel 1.

A fuel element transfer flask 14 supported on a carriage is arranged to run on rails 15 supported along the transfer bay over the five locations A-E. The flask 14 is of known type having a closure valve 14a in its lower end and a fuel element grapple connected by a cable to a winch mounted in its closed upper end. The valve 14a is operated by shafting S4, the grapple by shafting S5 and the winch by shafting S6.

The transfer flask 14 is moved along the rails by operation of shafting S7 which, in common with all the shafting drives to the transfer flask, is splined and extensible over its horizontal length so as to interconnect the operated part with the prime mover at any part of the flask's traverse. When the transfer flask is at either location D or E, preparatory to the transfer of a fuel element between the flask and the reactor pressure vessel or canning cell it is necessary to seal the base of the flask to the respective inlet port prior to operating the requisite valving. To this end, the main entry valve 1a and the canning cell inlet 13a ports are provided with a clamping mechanism operated by shafting S10 and S1 respectively. Shafting S2 operate the valve 13a on the canning cell entry valve whilst the main entry valve 1a is operated by shaft 23 and the fully enclosed motor 24. Shafting S3 operates a removable valve cover 25 for the main entry valve 1a. The removable valve cover 25 serves the purpose of permitting monitoring of gas leakage and excluding dust from the main entry valve and is arranged to open automatically if a pressure rise inside the valve occurs.

All operations in the canning cell 13 are performed in an evacuated state (about 0.1 atmosphere approximately).

The canning cell 13 is a cylindrical pressure vessel separate from, but mounted alongside and with its axis parallel to that of, the main pressure vessel 1. The lower part of the cell 13 has a turntable 16, with three annularly spaced stations. The turntable is driven from below by a shaft 16a which passes through the base of the vessel where it is driven by a motor 17. The function of the canning cell is to enable a fuel element to be enclosed in or removed from a container under vacuum conditions. The container closure mechanism is operated by a drive in parallel with the motor 17. Both the motor 17 and shafting 16a are totally enclosed.

Both the canning cell 13 and the air lock for the main pressure vessel entry valve 1a can be purged with nitrogen from a gas line 18.

The heads of chutes 11, 12 and 9b have covers 20, 21 and 22 respectively, the covers 20, 21 are coupled together and both are mounted on swivel mountings so that they can be removed by rotation of shafts S8. The cover 22 can be similarly removed by rotation of shaft S9.

The motor 24, which is totally enclosed is controlled remotely at the control room 5, but has provision for manual operation if required.

The arrangement can be seen in FIGS. 3–7 wherein the parts common to FIGS. 1 and 2 bear the same references.

In the control room 5 are positioned a row of motors M1–M10 which operate through line shafting S1–S10 the following components:

M1, for operating the clamping mechanism effective to clamp the transfer flask 14 to the canning cell inlet 13a through shafting S1 (FIG. 3)

M2, a valve at the inlet 13a for the canning cell through shafting S2 (FIG. 3)

M3, for operating the removable cover 25 for main entry valve 1a through shafting S3 (FIG. 7)

M4, for operating the bottom valve 14a of the transfer flask, through shafting S4 (FIG. 3)

M5, for operating the transfer flask grapple, through shafting S5 (FIG. 3)

M6, for operating the winch in the transfer flask 14, by shafting S6 (FIG. 3)

M7, for driving (i.e. traverse) of the transfer flask 14, by shafting S7 (FIG. 6)

M8, open and closure mechanism for covers 20, 21 for the spare chute and charge chute by shafting S8 (FIG. 7)

M9, open and closure mechanism for cover 22 for the discharge chute 9b by shafting S9 (FIG. 7)

M10, the clamping mechanism for clamping the transfer flask to the main entry valve 1a by shafting S10 (FIG. 7).

In operation a new fuel element in a sealed container is brought through the vehicle air lock in access passage 3 on the handling trolley into the loading bay 8a within inner containment, and is located under the charge chute 11. Meanwhile the transfer flask stands at the head of the discharge chute 9b with its bottom valve 14a open and its grapple fully raised and open. The canning cell having been evacuated and with its valve 13a shut, has its container closure mechanism open to receive a fuel element container. A container closure mechanism such as is shown in U. K. patent application No. 25,203/60 is employed for closing containers in the cell 13.

The transfer flask 14 is then traversed from the head of the chute 9b to that of the charge chute 11. The cover 20 over the charge chute 11 is then removed and the grapple is lowered down the charge chute 11 into the loading bay 8a where the grapple engages the lifting head of the fuel element container and raises it up to the chute 11 into the transfer flask 14. The transfer flask is then moved to location D at the head of the canning cell 13, and the charge chute cover 20 is replaced. The flask is then clamped to the canning cell port. The transfer flask is evacuated by a vacuum pump.

The canning cell entry valve 13a is next opened. The transfer flask winch is operated to lower the fuel element container (cap lowermost) into the canning cell 13 where, by operation of the container closure mechanism mentioned above, the container is unlatched from its closure cap and the container lifted off the fuel element the container then being raised into the transfer flask by raising the transfer flask grapple. The turntable 16 is rotated by motor 17 until a container storage station on the turntable 16 is directly beneath the transfer flask 14 and the container can then be lowered on to this station and the transfer flask grapple released from the fuel element container. The grapple is then raised a safe distance. The canning cell turntable 16 is then turned until the fuel element, divested of its container, is under the grapple which is then lowered to engage the element which is then hauled up into the flask. The transfer flask bottom valve 14a and canning cell valve 13a are then both closed and the transfer flask 14 is unclamped from the canning vessel port (station D).

The next operation is to unclamp the main entry valve cover which is then removed and the transfer flask 14 is traversed to station E over the reactor entry port, and clamped in this position. The transfer flask bottom valve 14a is then opened and nitrogen present removed by a vacuum pump. Helium is then introduced into the transfer flask to a pressure equal to that in the pressure vessel 1. The main entry valve 1a can then be opened, and the new fuel element lowered onto a spike in the transfer chamber 1d, the grapple is then released and raised back into the flask. The main entry valve 1a is then closed and the reactor charge machine in the upper chamber 1d (not shown) transfers the fuel element to the reactor core.

To unload a spent fuel element from the reactor, the reverse procedure is followed at locations D and E except that the reactor coolant gas under pressure which has entered the transfer flask is expelled by releasing the pressure in the closed flask, evacuating with the main entry valve shut and purging with nitrogen (i.e. the gas enclosed in building 3). The transfer flask valve is then closed. A further difference is that in the canning cell 13 the spent fuel element is placed in a container and sealed under vacuum, instead of being removed from its container as in the case of a new fuel element. Once enclosed in a sealed container the transfer flask 14 with the container is moved to location C and the cover 22 for the adjacent chute 9b removed. The container is then lowered into the storage magazine 9, released by the grapple which is then rased back into the transfer flask. The cover 22 of the discharge chute is replaced. The storage magazine is then rotated to leave a free compartment under the discharge chute 9b.

We claim:

1. A nuclear reactor installation comprising: a pressure vessel housing a nuclear reactor; a single access port in said pressure vessel for loading and unloading fuel elements into the pressure vessel; an inner containment structure for containing said reactor pressure vessel and providing a loading bay and a transfer chamber for fuel elements; an outer containment structure; an access passage extending through said inner and outer containment structures and communicating the exterior of the outer containment with said loading bay within said inner containment; a plurality of vertically extending passages communicating with said transfer chamber at a number of aligned locations along the floor of said chamber; said locations comprising a canning cell, an irradiated fuel element storage facility and said loading bay; a track within the chamber extending over the aligned locations and said access port; a transfer flask mounted for movement on said track; means retained by said transfer flask for lowering and raising a fuel element into and out of said flask; and a further vertical passage communicating the irradiated fuel element storage facility with the loading bay, whereby said single access passage communicates via said loading bay with both the loading and unloading routes for fuel elements.

2. A nuclear reactor installation as claimed in claim 1 wherein said access passage and said loading bay are contiguous and extend horizontally at a level below said transfer chamber and above said irradiated fuel element storage facility, and wherein said vertically extending passages connecting said loading bay with said transfer chamber and with said storage facility extend upwardly and downwardly respectively.

3. A nuclear reactor installation as claimed in claim 2 wherein said storage facility comprises a rotary magazine mounted behind shielding, and wherein said passage from said loading bay and said passage from said transfer chamber open through said shielding so as to communicate with selective portions of said magazine.

References Cited by the Examiner

UNITED STATES PATENTS

| | | | |
|---|---|---|---|
| 2,995,504 | 8/61 | Taylor | 193—11 |
| 3,000,728 | 9/61 | Long et al. | 176—61 |
| 3,020,225 | 2/62 | Wootton | 176—30 |
| 3,051,642 | 8/62 | Dent | 176—30 |
| 3,089,836 | 5/63 | Wootton | 176—32 |

FOREIGN PATENTS

| | | |
|---|---|---|
| 217,959 | 10/58 | Australia. |
| 866,541 | 4/61 | Great Britain. |

OTHER REFERENCES

Amorosi: "A Developmental Fast Neutron Breeder Reactor," Atomic Industrial Forum, September 1955, pp. 14, 18, 20, and 21.

CARL D. QUARFORTH, *Primary Examiner.*

REUBEN EPSTEIN, *Examiner.*